(12) United States Patent
Mueller

(10) Patent No.: US 10,556,534 B2
(45) Date of Patent: Feb. 11, 2020

(54) APPARATUS AND METHOD FOR TRANSPORTING CARGO OVER A CARGO BED

(71) Applicant: FORD GLOBAL TECHNOLOGIES, LLC, Dearborn, MI (US)

(72) Inventor: Todd John Mueller, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 92 days.

(21) Appl. No.: 15/679,858

(22) Filed: Aug. 17, 2017

(65) Prior Publication Data

US 2018/0111542 A1 Apr. 26, 2018

Related U.S. Application Data

(60) Provisional application No. 62/412,077, filed on Oct. 24, 2016.

(51) Int. Cl.
*B60P 7/08* (2006.01)
*B60R 9/06* (2006.01)
*B60R 9/10* (2006.01)

(52) U.S. Cl.
CPC .............. *B60P 7/0815* (2013.01); *B60R 9/06* (2013.01); *B60R 9/10* (2013.01)

(58) Field of Classification Search
CPC ......... B60P 7/0815; B60P 7/0807; B60P 7/15; B60P 7/0823; B60P 7/0876; B60P 7/132; B60P 3/079; B60P 7/10
USPC ........ 410/115, 110, 156, 106, 108, 116, 102, 410/89, 9, 98
See application file for complete search history.

(56) References Cited

U.S. PATENT DOCUMENTS

| | | | |
|---|---|---|---|
| 3,106,377 A * | 10/1963 | Cotton .................. | B60P 7/0807 410/116 |
| 3,841,660 A | 10/1974 | Clark | |
| 5,020,948 A * | 6/1991 | Ihara ..................... | B60P 7/0815 410/105 |
| 5,431,472 A | 7/1995 | Coffland | |
| 5,533,848 A * | 7/1996 | Davis .................... | B60P 7/0815 410/104 |
| 5,733,082 A * | 3/1998 | Schrader ............... | B60P 7/0807 410/101 |
| 5,758,810 A | 6/1998 | Stapleton | |
| 6,347,731 B1 | 2/2002 | Burger | |
| 6,598,922 B2 | 7/2003 | Morse et al. | |
| 6,959,845 B2 | 11/2005 | Aftanas et al. | |

(Continued)

FOREIGN PATENT DOCUMENTS

CN 104385993 A 3/2015
WO 2006040671 A2 4/2006

OTHER PUBLICATIONS

English Machine Translation of CN104385993A.

*Primary Examiner* — D Glenn Dayoan
*Assistant Examiner* — Sunsurraye Westbrook
(74) *Attorney, Agent, or Firm* — Jason Rogers; Vichit Chea; King & Schickli, PLLC

(57) ABSTRACT

An apparatus and method are provided for transporting cargo over a cargo bed. The apparatus includes a first rail, having a first key and a second key, and a first track member including (a) a first keyway having a first end and a second end, (b) a second keyway axially aligned with the first end and (c) a third keyway axially aligned with the second end.

13 Claims, 21 Drawing Sheets

(56) References Cited

U.S. PATENT DOCUMENTS

| | | | |
|---|---|---|---|
| 7,258,516 B1 * | 8/2007 | Collins | B60P 7/0807 |
| | | | 410/99 |
| 7,497,493 B1 | 3/2009 | Thiessen et al. | |
| 7,503,737 B2 * | 3/2009 | Sherman | B60P 7/0815 |
| | | | 410/104 |
| 7,878,743 B2 * | 2/2011 | Aftanas | B60P 7/15 |
| | | | 410/102 |
| 7,926,686 B2 | 4/2011 | Salvador et al. | |
| 9,248,784 B2 | 2/2016 | Kraeuter et al. | |
| 2004/0074940 A1 | 4/2004 | Aftanas et al. | |

* cited by examiner

APPARATUS AND METHOD FOR TRANSPORTING CARGO OVER A CARGO BED

This application claims the benefit of U.S. provisional patent application Ser. No. 62/412,077, filed on 24 Oct. 2016, the full disclosure of which is incorporated herein by reference.

TECHNICAL FIELD

This document relates generally to the motor vehicle equipment field and more particularly to a new and improved apparatus and method for transporting cargo over a cargo bed of a pickup truck or the like.

BACKGROUND

A need exists for a simple, convenient and easy to use apparatus and method for increasing the cargo carrying capacity of a motor vehicle.

This document relates to a new and improved apparatus and method for transporting cargo supported on two rails above the cargo bed of a pickup truck or other like vehicle. The rails may be displaced along the length of the cargo bed and may be adjusted to support various cargo carrying accessories such as a bicycle rack, roof top storage vessel or the like. The apparatus frees the cargo bed for storing other cargo. The apparatus sits outboard of a tonneau cover thereby allowing the tonneau cover to be opened or closed when in use, if the pickup truck is so equipped. Further, the two rails are an integral part of the design of the pickup truck and may be easily stored at the top of the cargo bed sidewalls in an aesthetically pleasing manner when not in use.

SUMMARY

In accordance with the purposes and benefits described herein, an apparatus and method are provided for transporting cargo over a cargo bed of a motor vehicle. That apparatus comprises a first rail and a first track member. The first rail has a first key and a second key. The first track member includes (a) a first keyway having a first end and a second end, (b) a second keyway axially aligned with the first end and (c) a third keyway axially aligned with the second end.

The first end and the second end of the first keyway may be both +-shaped. The second keyway and the third keyway may be angularly offset from the first end and the second end.

The first key and the second key may also be +-shaped. In addition, the apparatus may include a first clamp lever connected to the first key and a second clamp lever connected to the second key. Further, a first screw may connect the first clamp lever to the first key. A second screw may connect the second clamp lever to the second key.

In addition, the first end of the first keyway may include a first +-shaped section. Similarly, the second end of the first keyway may include a second +-shaped section.

The first screw may include a first shaft having a first head at a first proximal end and the first key at the first distal end. Similarly, the second screw may include a second shaft having a second head at a second proximal end and the second key at the second distal end.

Still further, the apparatus may include a second rail and a second track member. The second rail may have a third key and a fourth key. The second rail may have (a) a fourth keyway having a third end and a fourth end, (b) a fifth keyway aligned with the third end and (c) a sixth keyway aligned with the fourth end.

The third end and the fourth end of the fourth keyway may both be +-shaped. The fifth keyway and the sixth keyway may both be +-shaped. Further, the fifth keyway and the sixth keyway may be angularly offset from the third end and the fourth end.

The apparatus may also include a tonneau cover inboard the first track member and the second track member.

In accordance with an additional aspect, the method of carrying cargo over a cargo bed comprises the steps of: (a) raising a first rail from a stowed position into a deployed position, (b) releasing a first end of the first rail from a first track member, (c) pivoting the first end of the first rail over the cargo bed and (d) engaging the first end of the first rail with a second track member at an opposite side of the cargo bed.

The method may further include the step of unclamping the first end from the first track member in order to release the first end from the first track member. Further, the method may include the step of displacing a first key at the first end through the second keyway and a first keyway of the first track member to release the first end from the first track member.

Still further, the method may include the step of inserting the first key through a fourth keyway in the second track member to engage the first end of the first rail with the second track member. Additionally, the method may include the steps of sliding the first key along a second channel in the second track member and then clamping the first end to the second track member.

In the following description, there are shown and described several preferred embodiments of the device. As it should be realized, the device is capable of other, different embodiments and its several details are capable of modification in various, obvious aspects all without departing from the device as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification illustrate several aspects of the apparatus and method and together with the description serve to explain certain principles thereof.

FIG. 7b is a cross sectional view taken along line 7b-7b of FIG. 7a.

Figure 1:
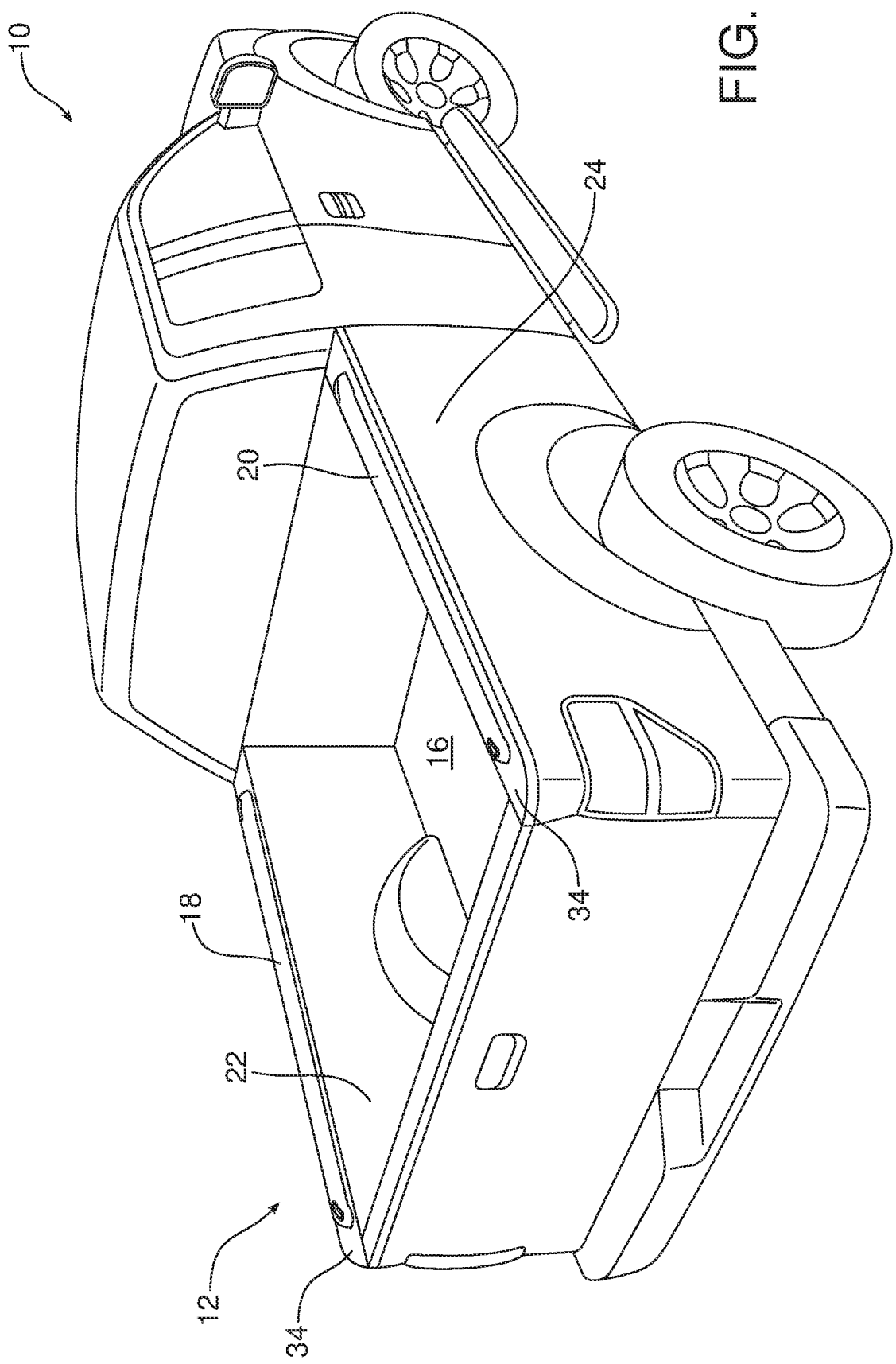
FIG. 1 is a rear perspective view of a pickup truck equipped with the apparatus wherein the apparatus is illustrated in the stowed position with the two rails of the apparatus tucked down and extending along the top of the opposed cargo bed walls.

Reference will now be made in detail to the illustrated embodiment of the apparatus.

DETAILED DESCRIPTION

Reference is now made to FIGS. 1-5 illustrating a pickup truck 10 equipped with the apparatus 12 to carry or transport cargo, such as the bicycle 14, over the cargo bed 16. The apparatus 12 includes a first rail 18 and a second rail 20.

Figure 2:
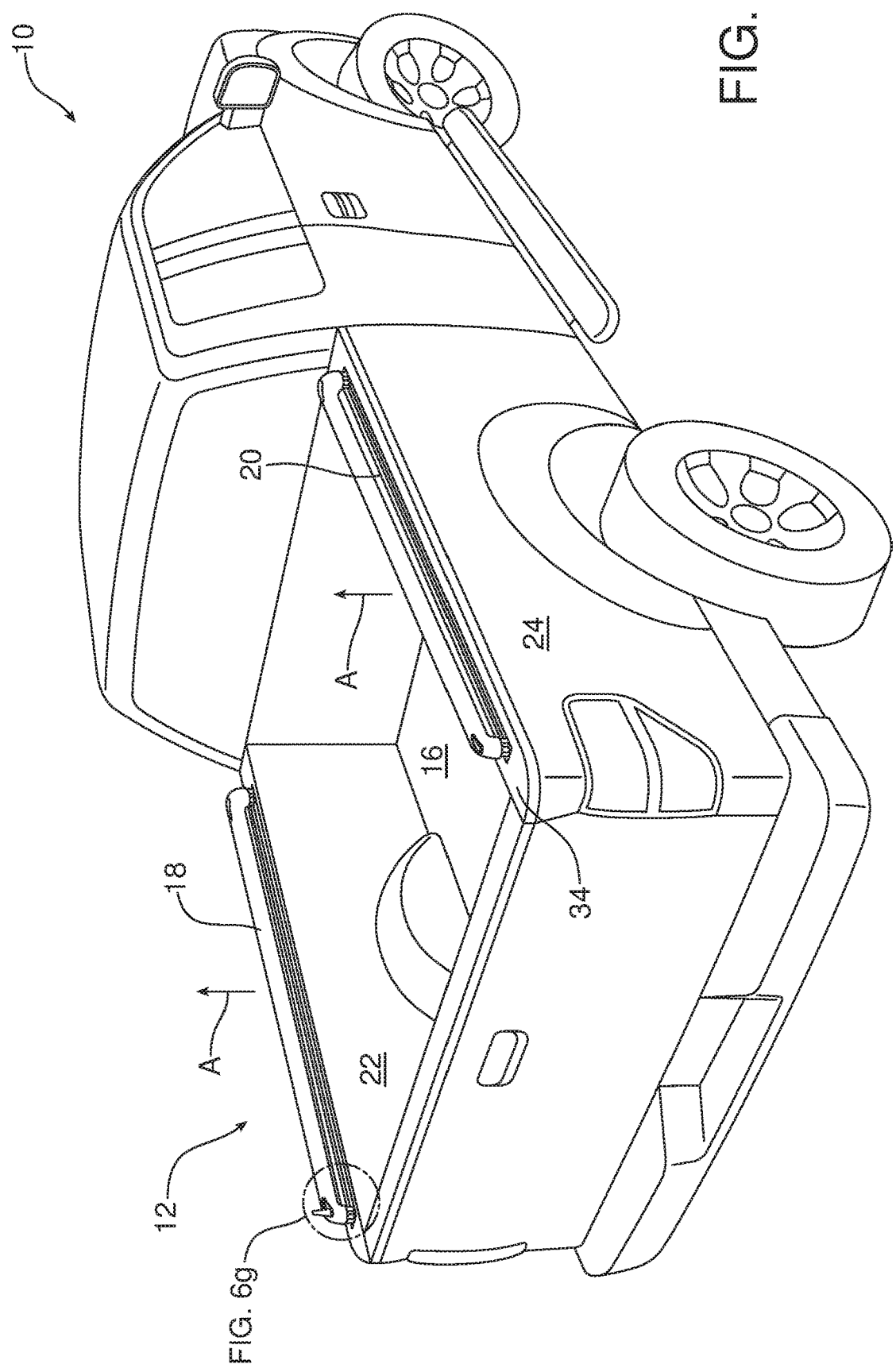
FIG. 2 is a view similar to FIG. 1 but illustrating the two rails in the raised or deployed position, ready for use.

FIG. 1 illustrates the apparatus 12 in the stowed position with the first rail 18 tucked down along or inside the top of the first cargo bed sidewall 22 and the second rail 20 tucked down along or inside the top of the second cargo bed sidewall 24. FIG. 2 illustrates the apparatus 12 in the deployed position with the first rail 18 and the second rail 20 raised up (note action arrows A) from the stowed position illustrated in FIG. 1.

Figure 3:
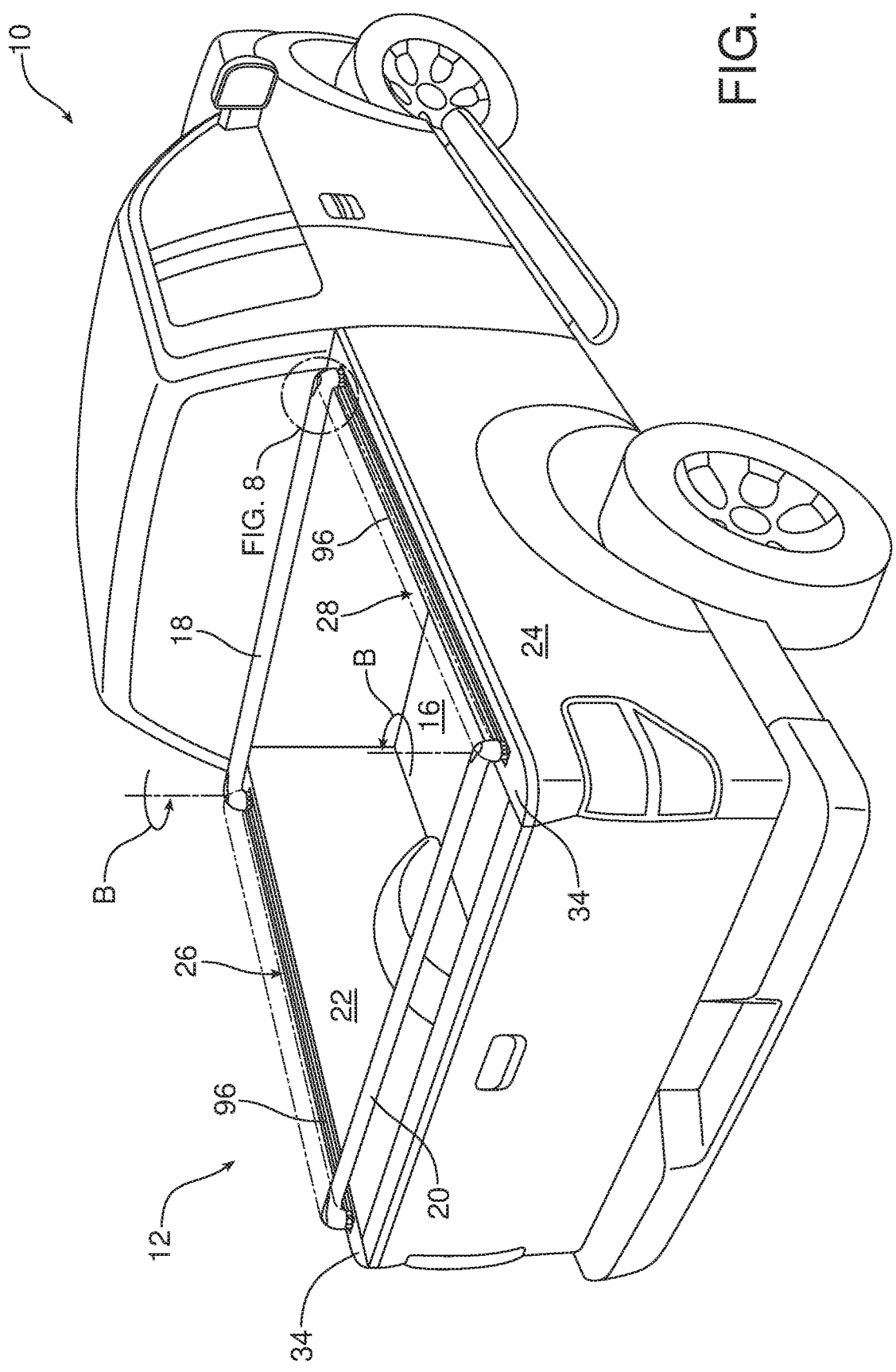
FIG. 3 is a view similar to FIG. 2 illustrating the two rails pivoted to span the cargo bed.

FIG. 3 illustrates how the first rail 18 and the second rail 20 may be displaced to span between the first cargo bed sidewall 22 and the second cargo bed sidewall 24 overlying the bed 16 when those rails are in the deployed position. Note action arrows B illustrating the pivoting of the two rails 18, 20.

Figure 4:
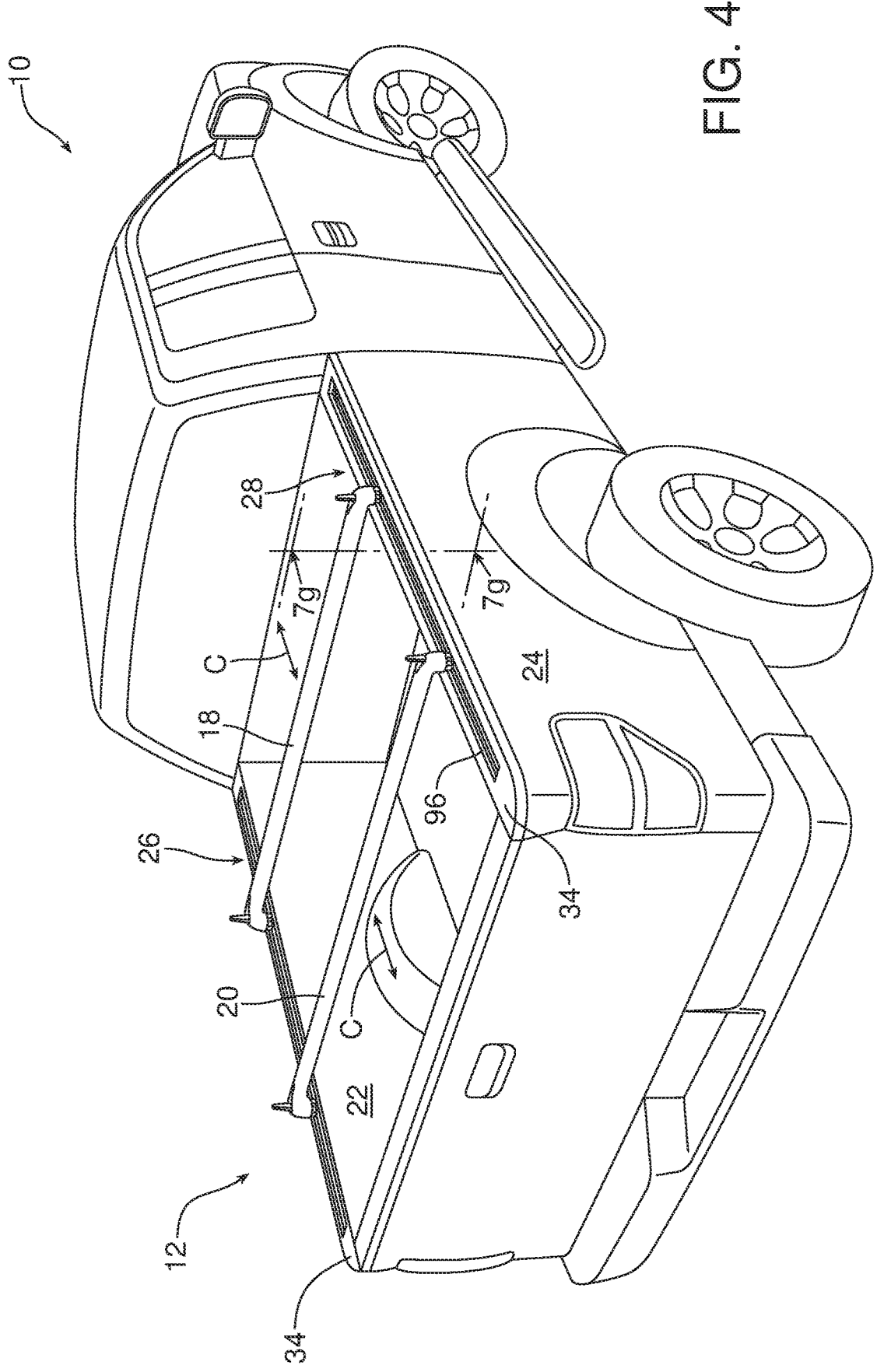
FIG. 4 is a view similar to FIG. 3 illustrating how the position of the two rails may be adjusted longitudinally along the cargo bed in order to place the rails in a desired configuration.
Figure 5:
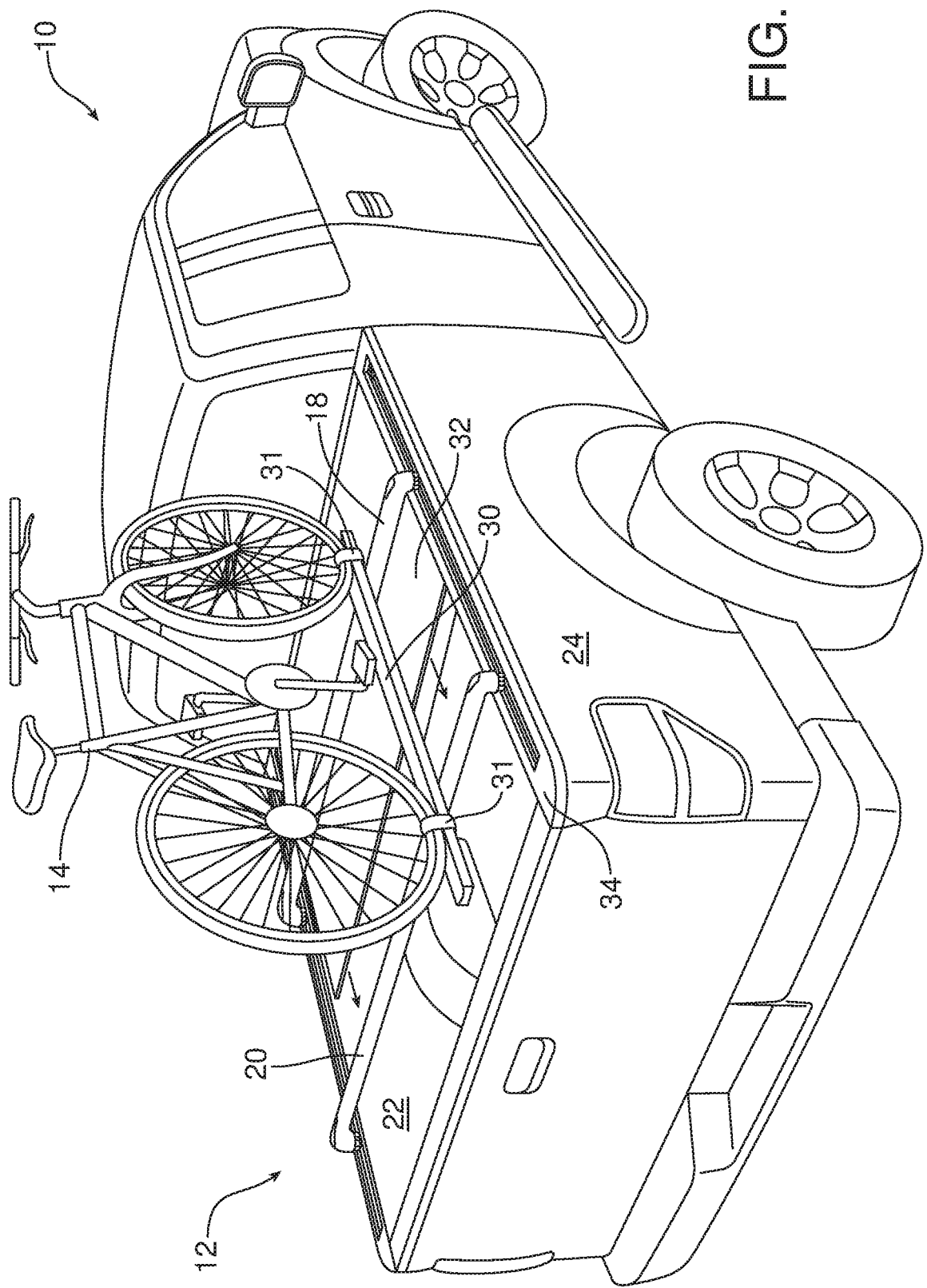
FIG. 5 is a view similar to FIG. 4 but illustrating a bicycle held on a bicycle rack mounted to the two rails.

FIG. 4 illustrates how the two rails 18, 20 may be displaced (note action arrows C) along the longitudinal axis of the pickup truck 10 by means of the first track member 26 in the first cargo bed sidewall 22 and the second track member 28 in the second cargo bed sidewall 24. The two rails 18, 20 may be configured in a number of different ways. As illustrated in FIG. 5 the two rails 18, 20 are spaced apart as necessary to mount a cargo accessory in the form of a bicycle rack 30. Straps 31 hold the bicycle 14 to the bicycle rack 30. Here it should be appreciated that other cargo accessories could be used instead of the bicycle rack 30.

As should be further appreciated from reviewing FIG. 5, the first track member 26 in the first cargo bed sidewall 22 and the second track member 28 in the second cargo bed sidewall 24 are provided outboard of the tonneau cover 32 spanning the cargo bed 16. Further, the deployed rails 18, 20 spanning the cargo bed 16 as well as the bicycle rack 30 and bicycle 14 held thereon are raised above the tonneau cover 32. Accordingly, the tonneau cover 32 may be opened or closed to expose or conceal the cargo bed 16 with the rails 18, 20 deployed. Further, it should be appreciated that the bicycle 14 supported on the rails 18, 20 above the cargo bed 16 maintains the full storage space of the cargo bed for other cargo.

Figure 6A:
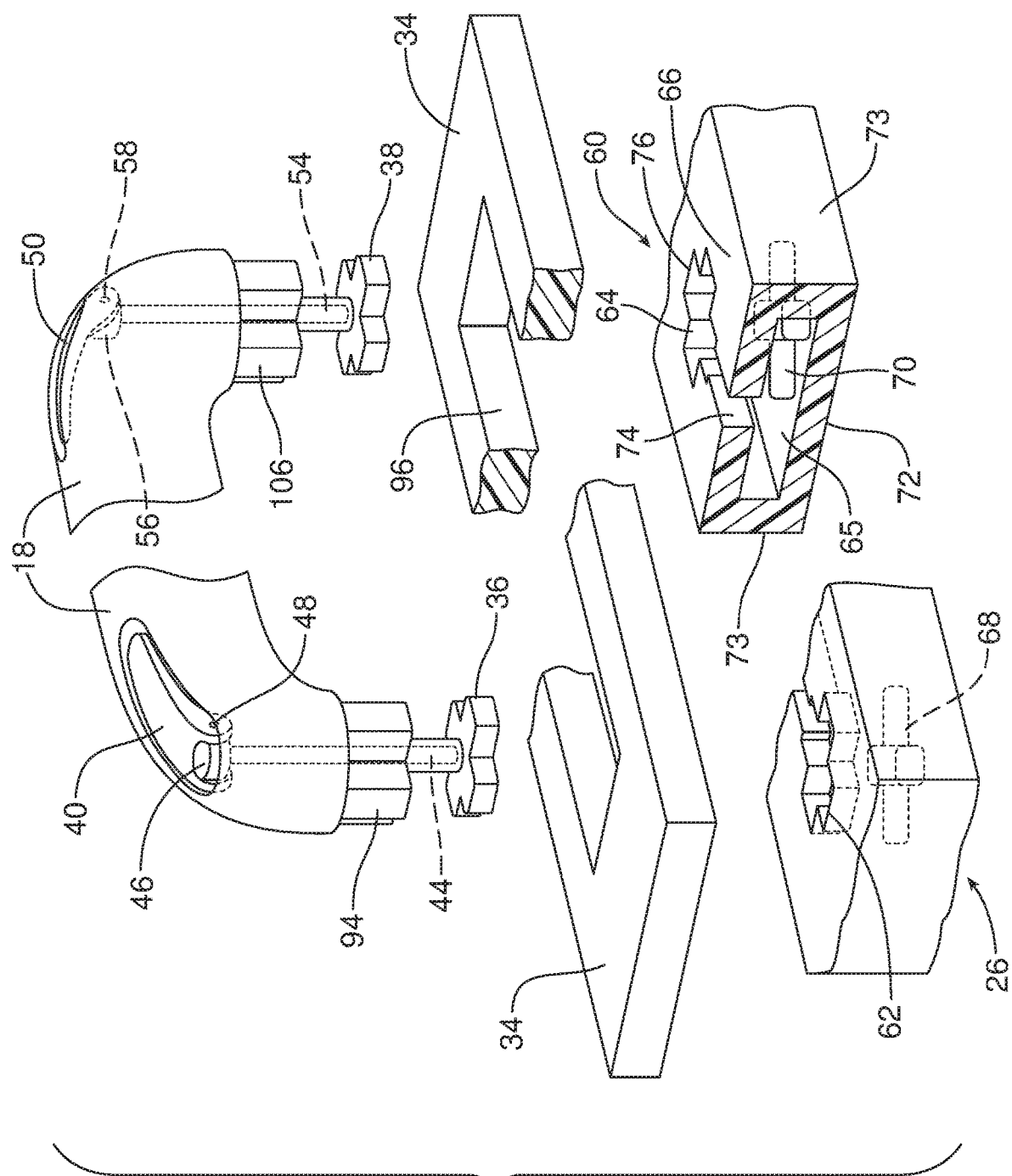
FIG. 6a is an exploded perspective view of the first rail, both ends of the first track member and the decorative trim piece that overlies the track member.
Figure 6B:
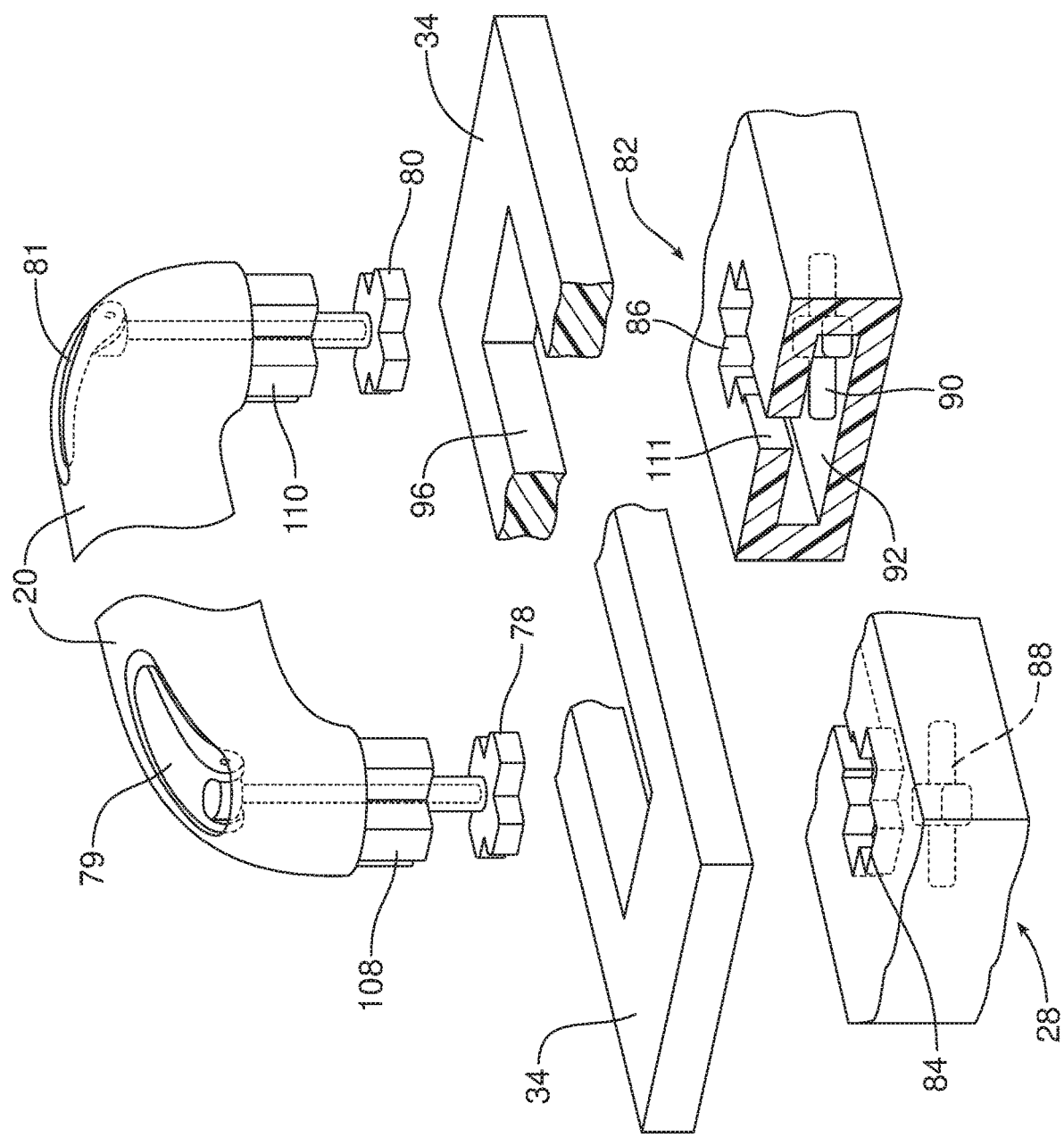
FIG. 6b is an exploded perspective view of the second rail, both ends of the second track member and the decorative trim piece that overlies the track member.
Figure 6C:
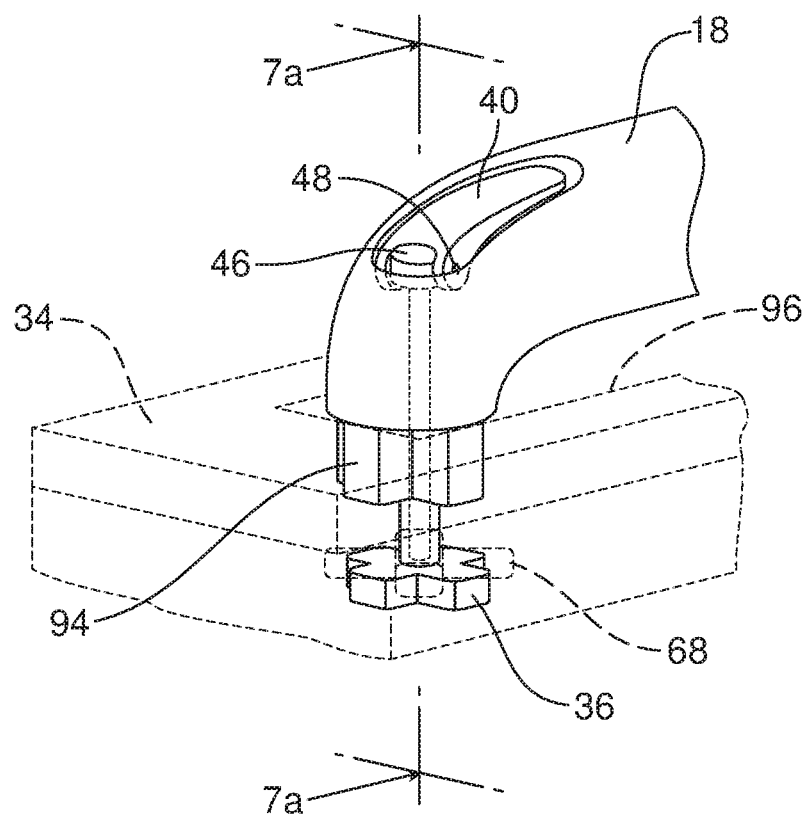
FIGS. 6c-6g are views similar to FIG. 6a but illustrating the operation of the clamp lever at the illustrated end of the rail.

Reference is now made to FIGS. 6a and 6b illustrating the first rail 18, the second rail 20, the first track member 26, the second track member 28 and the trim panels 34 for concealing the track members from view at the top of the first and second cargo bed sidewalls 22, 24.

As illustrated in FIG. 6a, the first rail 18 includes a first key 36 and a second key 38. A first clamp lever 40 is connected to the first key 36 by a first screw 44 having a first head 46 at a first proximal end and the first key 36 at the first distal end. The first clamp lever 40 is connected by the pivot pin 48 to the first head 46.

A second clamp lever 50 is connected to the second key 38 (see FIG. 6b) by a second screw 54 having a second head 56 at a second proximal end and the second key 38 at the second distal end. The second clamp lever 50 is connected by the pivot pin 58 to the second head 56. In the illustrated embodiment, the first key 36 and the second key 38 are both +-shaped.

As further shown in FIG. 6a, the first track member 26 includes a main or first keyway 60 having a first end 62 and a second end 64. In the illustrated embodiment, the first keyway 60 is provided in the top wall 66 of the first track member 26. A locking or second keyway 68 and a locking or third keyway 70 are provided in the bottom wall 72 of the first track member 26. The second keyway 68 is provided on the same z-axis center line with the first end 62 of the first keyway 60 while the third keyway 70 is provided on the same z-axis centerline with the second end 64 of the first keyway. A first internal chamber 65 is provided in the first track member 26 between the top wall 66, the bottom wall 72 and the two sidewalls 73.

In the illustrated embodiment, the first end 62 and the second end 64 of the first keyway 60 are +-shaped. An elongated intermediate section 74 of the first keyway 60 extends between and connects the first end 62 with the second end 64. The intermediate section 74 has a reduced width compared to the legs 76 of the first and second ends 62, 64. In addition, the second keyway 68 is angularly offset from the first end 62 and the third keyway 70 is angularly offset from the second end 64. In the illustrated embodiment, the offset is 45 degrees about the respective shared or common z-axis centerlines.

As illustrated in FIG. 6b, the second rail 20 is similar in structure to the first rail 18. The second rail 20 includes a third key 78 and a fourth key 80 connected to clamp levers 79 and 81. The second track member 28 includes a fourth keyway 82 identical to the first keyway 60. Accordingly, the fourth keyway 82 includes a third end 84, identical to the first end 62, and a fourth end 86 identical to the second end 64. Further, the second track member 28 also includes a fifth keyway 88, identical to the second keyway 68, and a sixth keyway 90 identical to the third keyway 70. In addition, the second track member 28 includes a second channel 92 identical to the first channel 65.

Thus, it should be appreciated that the third end 84 and the fourth end 86, as well as the fifth keyway 88 and the sixth keyway 90, are all +-shaped. In addition, the fifth keyway 88 is angularly offset from the third end 84 by 45 degrees about a shared or common axis. The sixth keyway 90 is angularly offset from the fourth end 86 by 45 degrees about another shared or common axis.

The operation of the apparatus 12 will now be described in detail first with reference to FIGS. 1, 6c, 7a and 7b. These figures illustrate the first rail 18 in the stowed position. As shown, the cross-shaped section 94 at the end of the first rail 18 extends through the slot 96 in the trim panel 34 and the first end 62 of the first keyway 60 down into the channel 65. The first key is angularly oriented so as to be offset 45 degrees with respect to the second keyway 68 and the first clamp lever 40 is engaged so that the first key is clamped against the bottom wall 72 of the first track member 26.

Figure 6D:
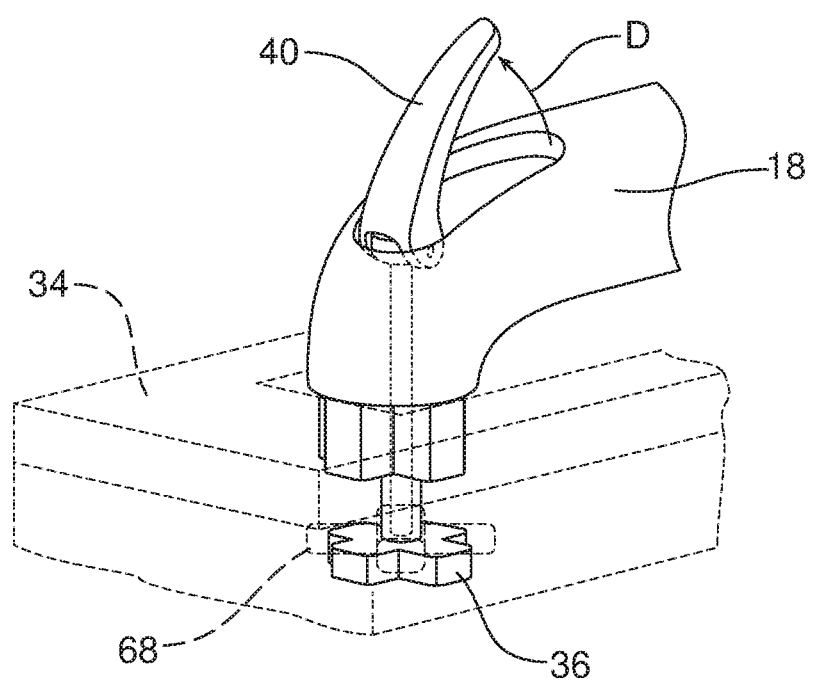
Figure 6E:
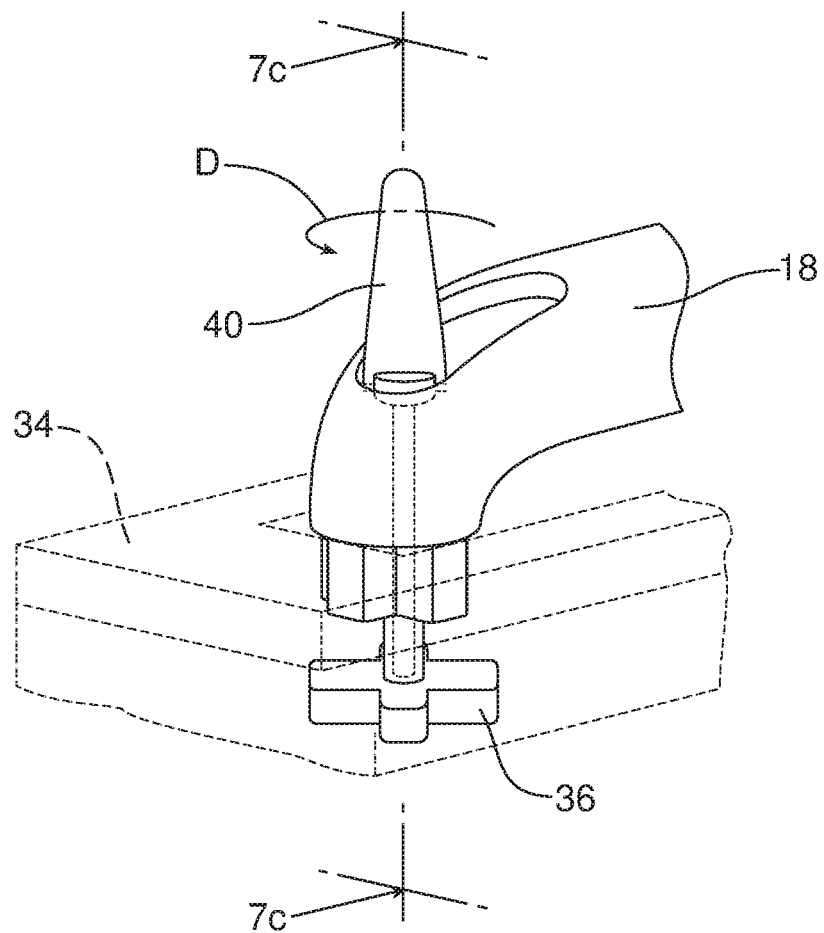
Figure 7A:
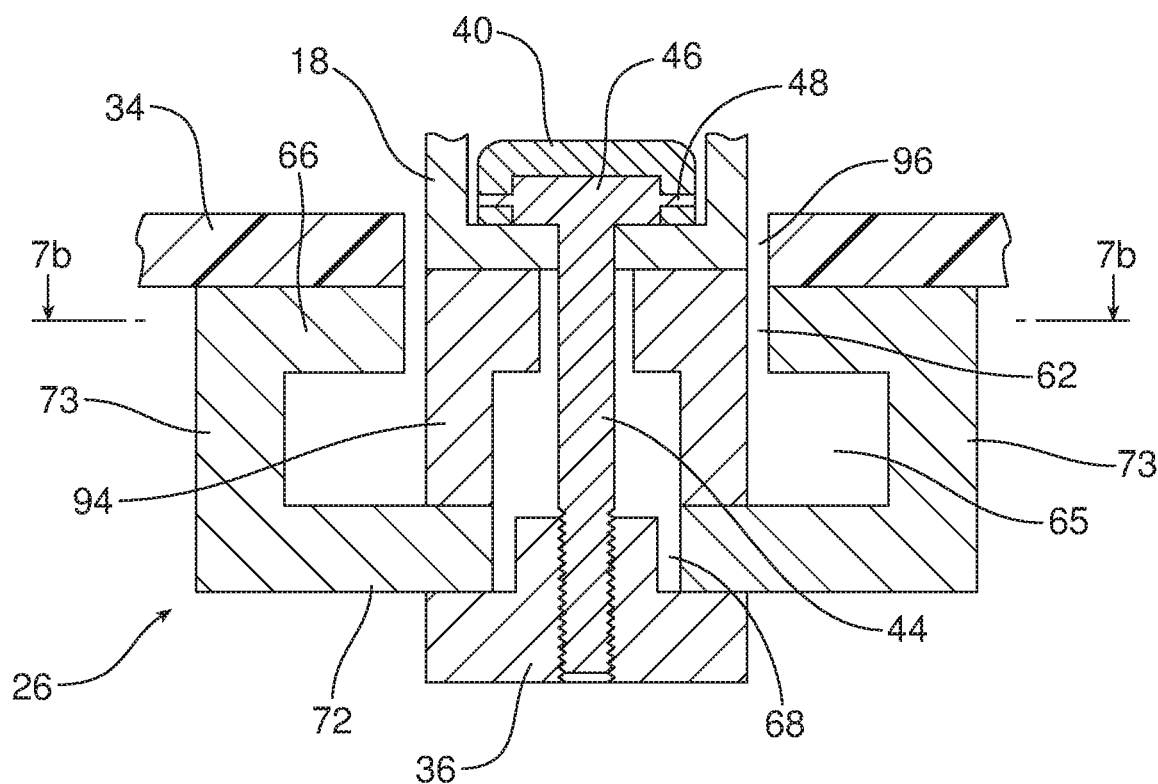
FIG. 7a is a cross sectional view illustrating one end of a rail in the associated track member when the apparatus is in the stowed position also shown in FIG. 1.
Figure 7B:
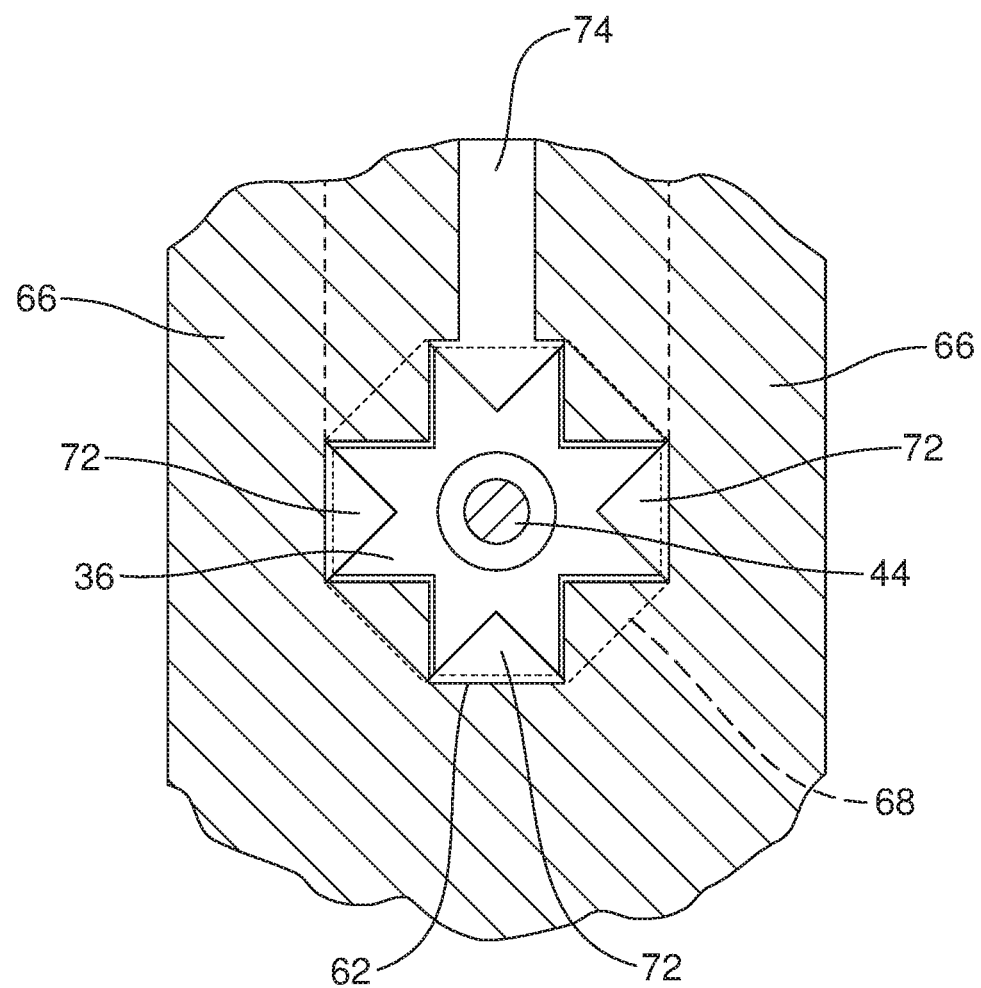
Figure 7C:
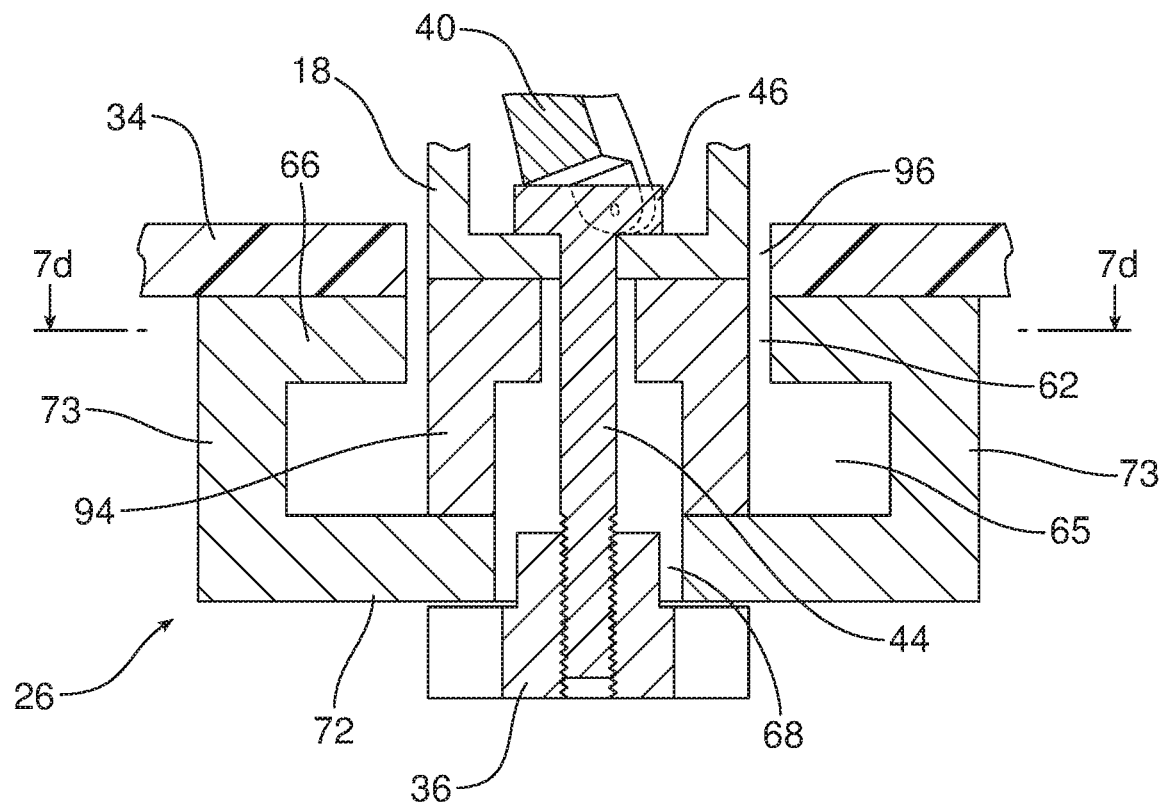
FIG. 7c is a view similar to FIG. 7a but showing the clamp lever raised to unclamp the key from the track member and turned 45 degrees to align the key with the second keyway.

One displaces the first rail 18 from the stowed position illustrated in FIGS. 1, 7a and 7b to the deployed position illustrated in FIGS. 2 and 7c by raising the first clamp lever 40 in the direction of action arrow D in FIG. 6d so as to release the clamping pressure between the first key 36 and the bottom wall 72 of the first track member 26. The first clamp lever 40 is then rotated through 45 degrees as illustrated by action arrow E in FIG. 6e.

Figure 6F:
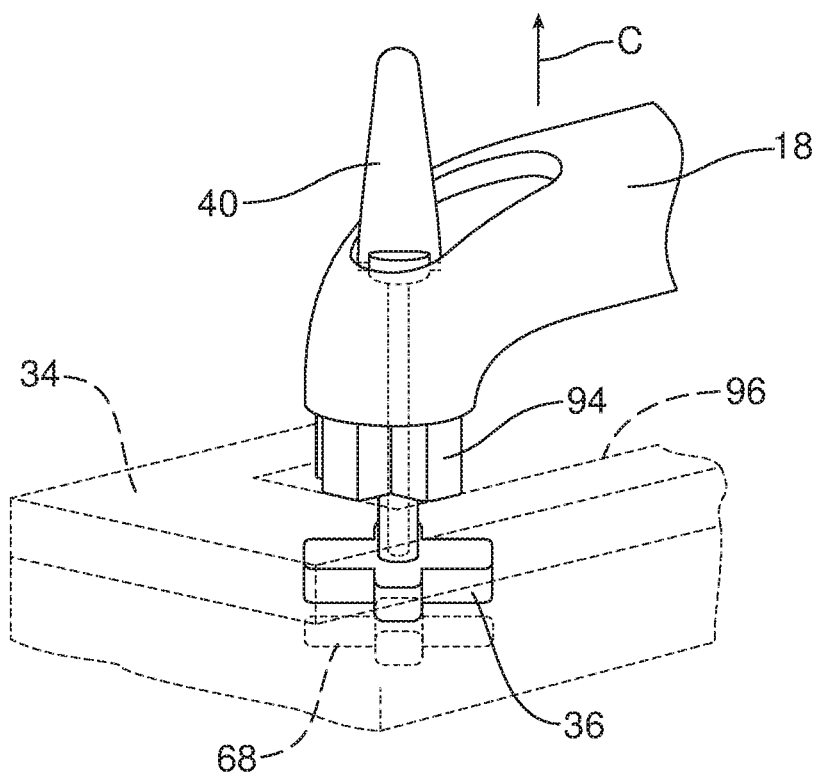
Figure 6G:
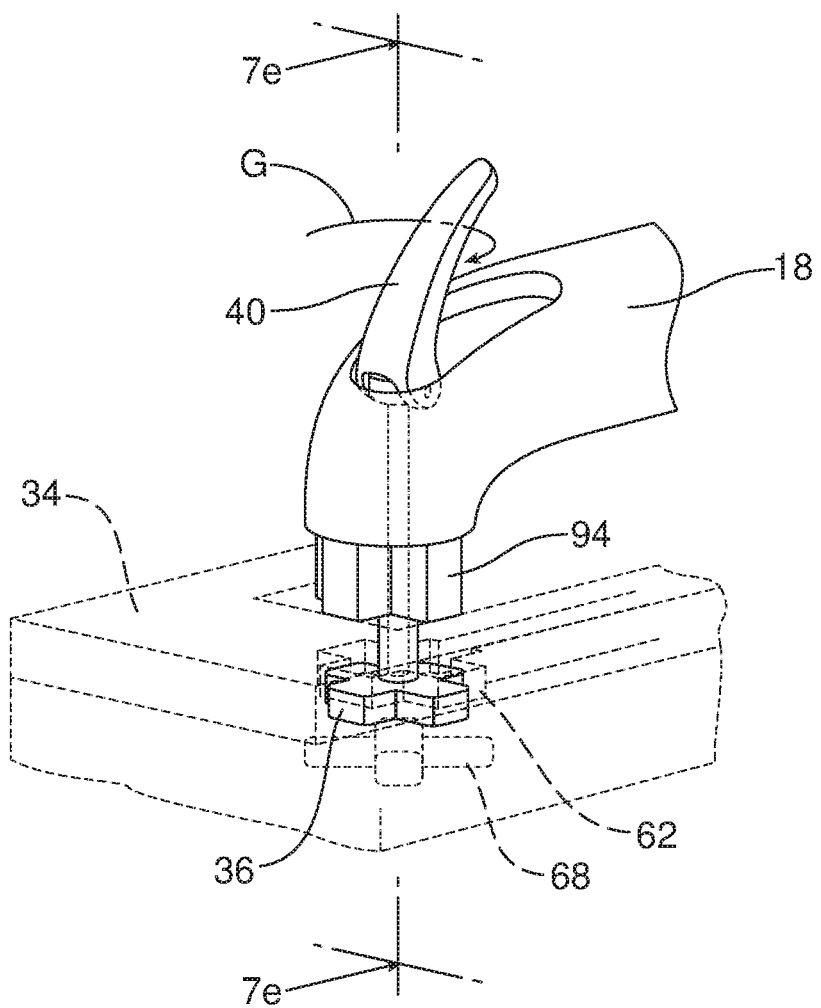
Figure 7D:
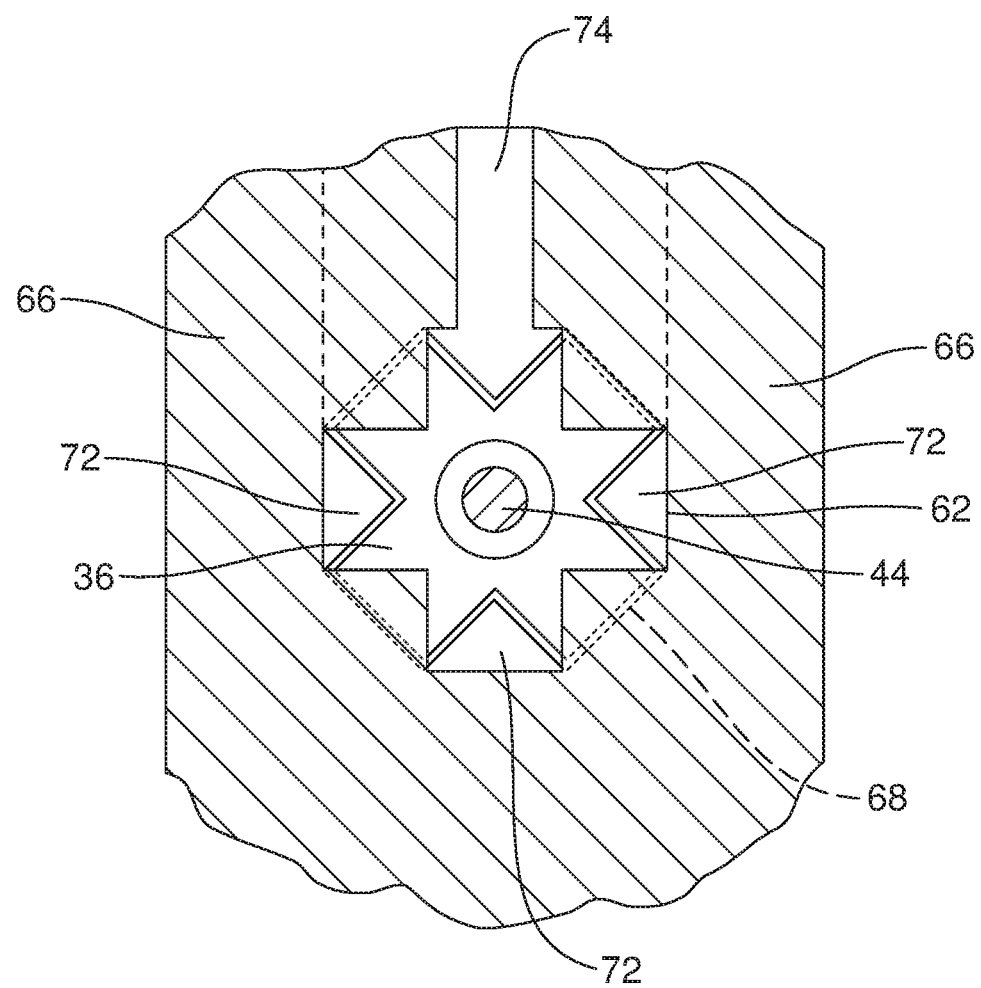
FIG. 7d is a cross sectional view taken along line 7d-7d of FIG. 7c.
Figure 7E:
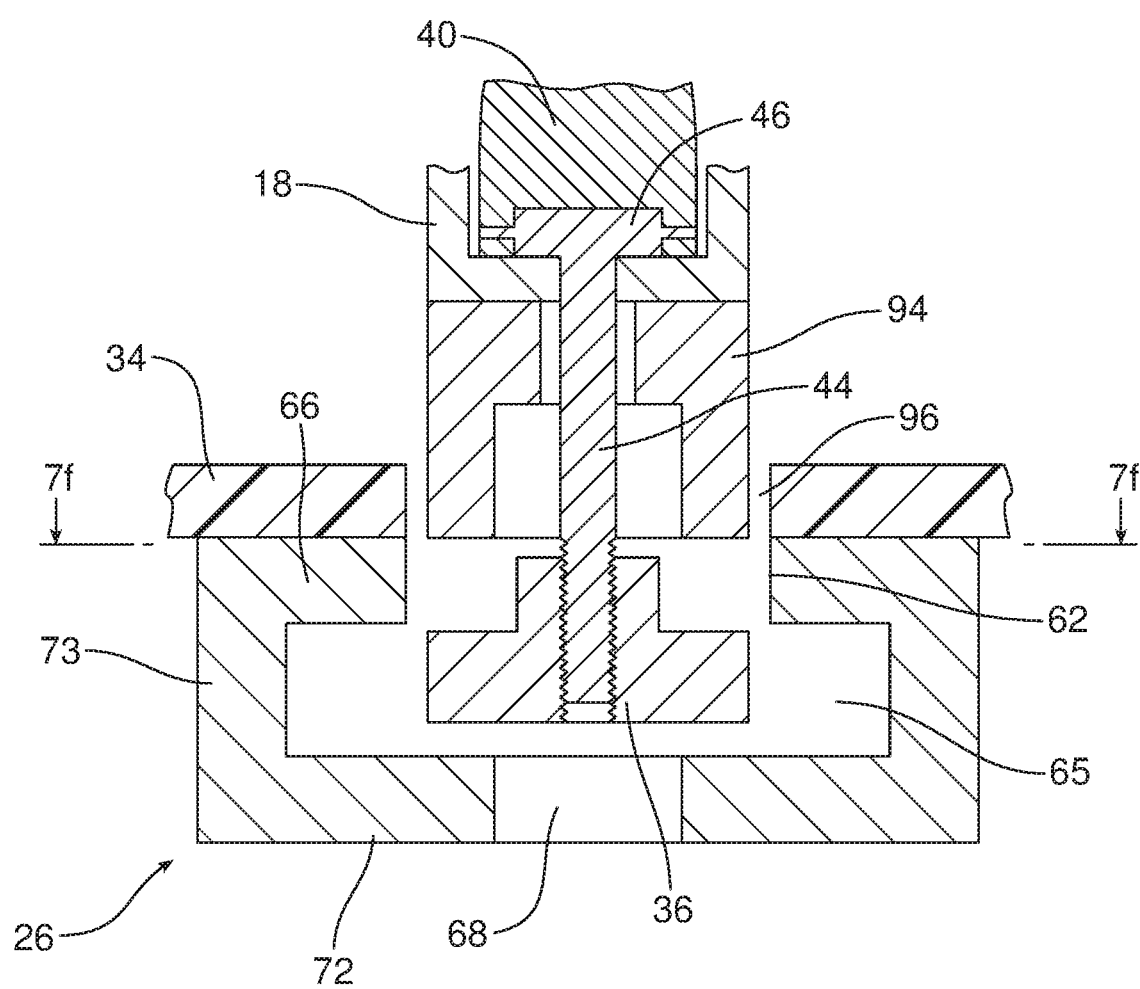
FIG. 7e is a view similar to FIG. 7c but showing the rail raised into the deployed position. The lever has been rotated 45 degrees to align the first key with the first end of the first keyway.
Figure 7F:
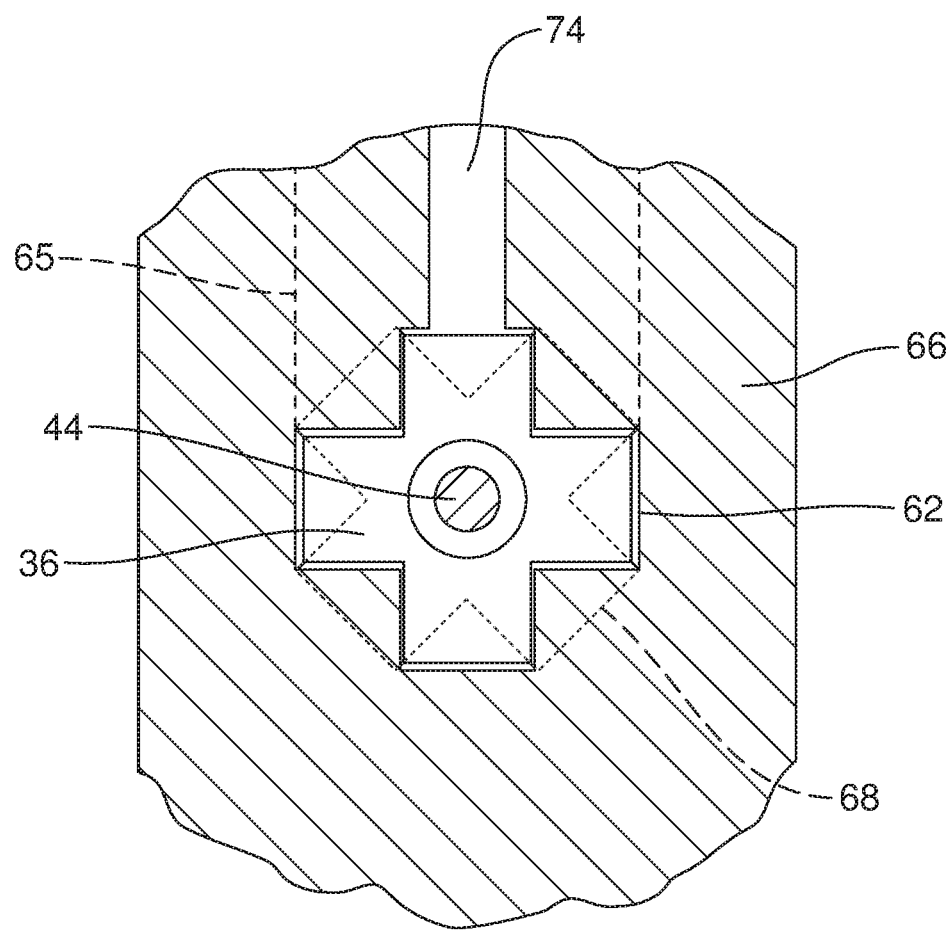
FIG. 7f is a cross sectional view taken along line 7f-7f of FIG. 7e.

This rotates the first key 36 into angular alignment with the second keyway 68 (see FIGS. 7c and 7d). The same steps are performed at the opposite end of the first rail 18 using the second clamp lever 50 to release clamping pressure and angularly align the second key 38 with the third keyway 70. The first rail 18 is then raised (note action arrows A in FIG. 2 and action arrow F in FIG. 6f) into the deployed position. The clamp levers 40 and 50 are rotated back 45 degrees (note action arrow G in FIG. 6g) to angularly offset the first and second keys 36, 38 from the second and third keyways 68, 70 in order to (a) support the first rail 18 in the raised or deployed position and (b) angularly align those keys with the first and second ends 62, 64 of the first keyway 60. See FIGS. 7e and 7f.

Next, the end of the first rail 18, including the first key 36, is lifted so that the first key passes through the first end 62 of the first keyway 60 and the slot 96 of the trim panel 34. The second key 38 may be made larger and of a size to prevent passage through the second end 64 of the first keyway 60. This allows the first rail 18 to be pivoted in the first keyway 60 about the second key 38 until the first key 36 is aligned with the open third end 84 of the fourth keyway 82 in the second track member 28. The first key 36 is then inserted through the slot 96 in the trim panel 34 into and through the third end 84 of the fourth keyway 82 until the first key rests on the bottom wall 98 of the second track member overlying the fifth keyway 88. See also FIG. 3.

Figure 7G:
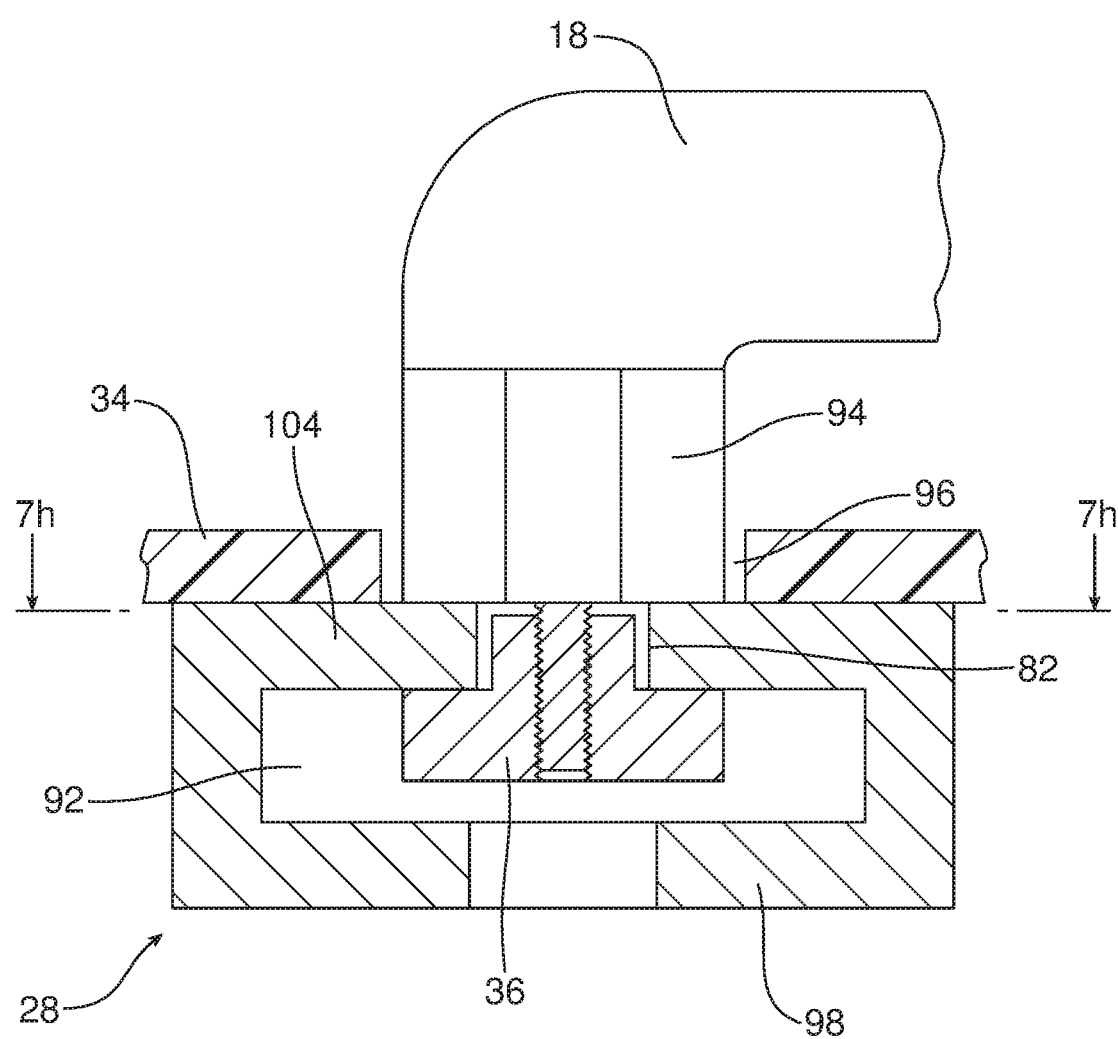
FIG. 7g is a cross sectional view taken along line 7g-7g of FIG. 4.
Figure 7H:
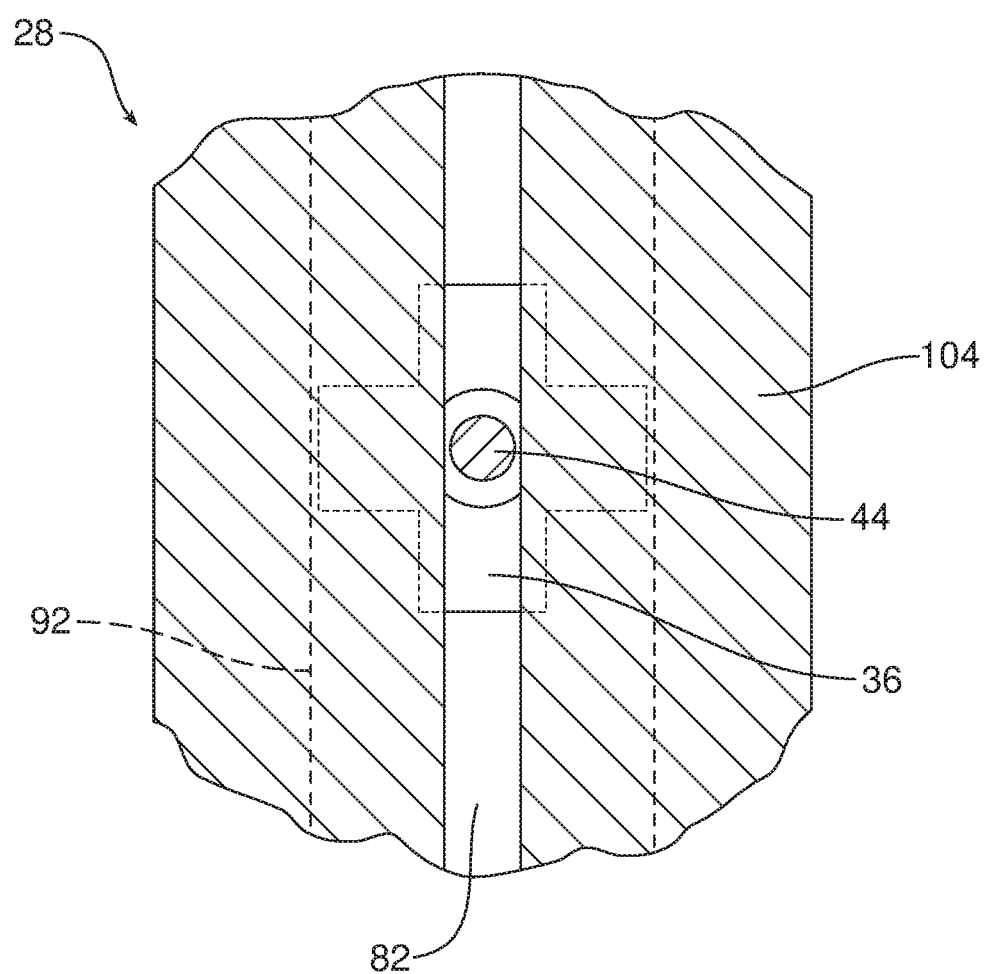
FIG. 7h is a cross sectional view taken along line 7h-7h of FIG. 7g.

The second rail 20 is displaced or moved in the same manner. The two rails 18, 20 may then be shifted along the two longitudinal track members 26, 28 into any desired position or configuration over the cargo bed 16 as shown by action arrows C in FIG. 4. FIGS. 7h and 7i illustrate how the first key 36 is oriented and held in the intermediate section 74 of the first keyway 60 during the adjustment process. The other keys 38, 78 and 80 are similarly oriented in the associated channels 65, 92 of the track members 26, 28. FIG. 7g illustrates how the cross-shaped or +-shaped section 94 at the end of the rail 18 is rotated and bears against the top wall 104 of the track member 28 to support the weight of the rail and any accessory and cargo carried thereon. The other cross-shaped sections 106, 108 and 110 function in the same manner.

Figure 8:
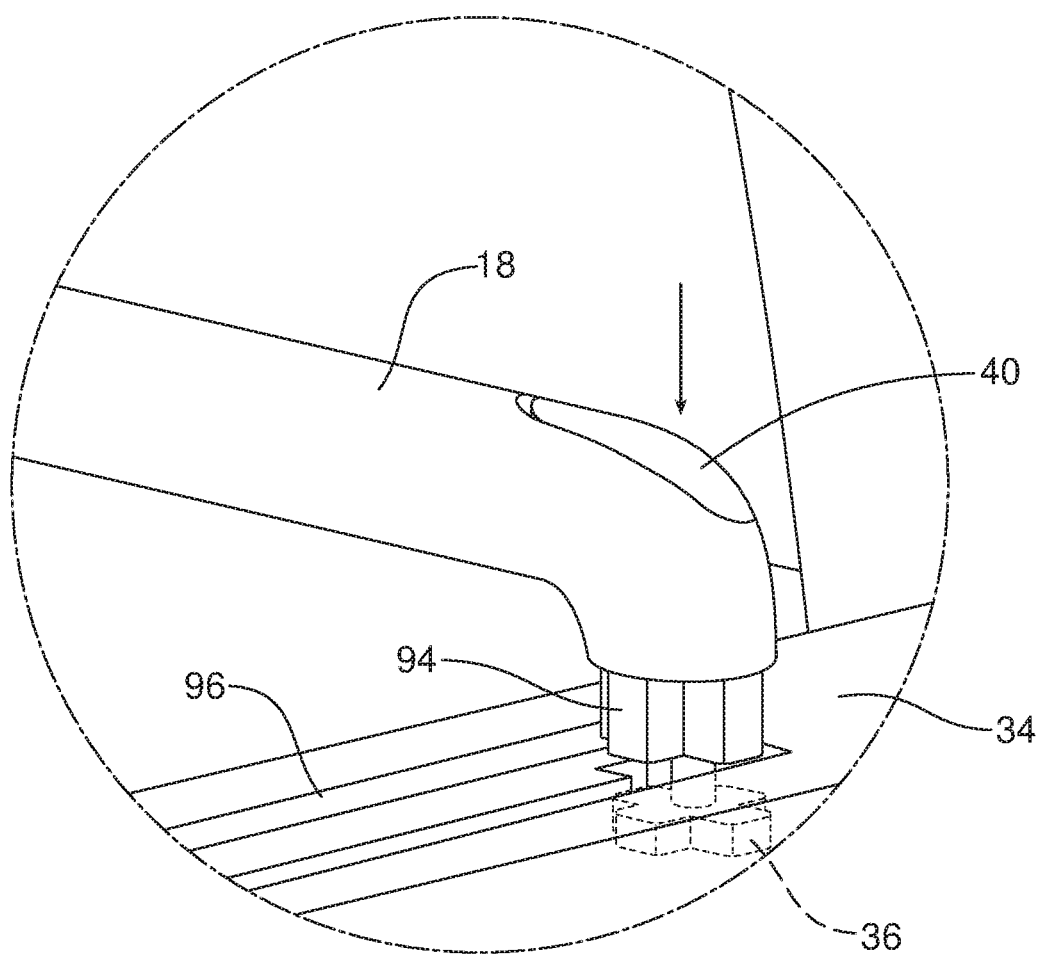
FIG. 8 is a detailed view at the point indicated in FIG. 1.

Once properly positioned along the guide track members 26, 28, the rails 18, 20 are locked in position by pivoting the clamp levers 40, 50, 100, 102 down to bring the keys 36, 38, 78, 80 into clamping engagement with the top walls 66, 104 of the two track members 26, 28. See, for example FIGS. 5 and 8. The bicycle rack 30 may then be secured to the two rails 18, 20 as desired. Here it should be noted that the cross-shaped sections 94, 106, 108 and 110 of the rails 18, 20 extend through the slots 96 in the trim panels 34, span the intermediate section 74 of the first keyway and the intermediate section 111 of the fourth keyway 82 and engage the top walls 66, 104 of the two track members 26, 28 to support the rails 18, 20 and the cargo carried thereon in the deployed position.

After transporting the bicycle 14, the bicycle and the bicycle rack 30 may be removed from the rails 18, 20 and the rails returned to the stowed position illustrated in FIG. 1 by performing the previously described steps in reverse order.

The foregoing has been presented for purposes of illustration and description. It is not intended to be exhaustive or to limit the embodiments to the precise form disclosed. Obvious modifications and variations are possible in light of the above teachings. For example, in the embodiment described above, the second key 38 is sized to be captured by the first and second ends 62, 64 so as to provide for permanent attachment and prevent theft of the rail 18 while still providing free sliding movement in the first keyway 60 for position adjustment of the rail. In an alternative embodiment, the second key 38 may be identical in size to the first key 36 so as to allow removal of the rail 18. All such modifications and variations are within the scope of the appended claims when interpreted in accordance with the breadth to which they are fairly, legally and equitably entitled.

What is claimed:

1. An apparatus, comprising:
   a first rail having a first key and a second key;
   a first track member including (a) a first keyway having a first end and a second end, (b) a second keyway axially aligned with said first end and (c) a third keyway axially aligned with said second end;
   a second rail having a third key and a fourth key and a second track member including (a) a fourth keyway having a third end and a fourth end, (b) a fifth keyway aligned with the third end and (c) a sixth keyway aligned with the fourth end; and
   a tonneau cover inboard of said first track member and said second track member.

2. The apparatus of claim 1 wherein
   said first end and said second end of said first keyway are both +-shaped.

3. The apparatus of claim 1, wherein said second keyway and said third keyway are both +-shaped.

4. The apparatus of claim 3, wherein said second keyway and said third keyway are angularly offset from said first end and said second end.

5. The apparatus of claim 4, further including a first clamp lever connected to said first key and a second clamp lever connected to said second key.

6. The apparatus of claim 5, including a first screw connecting said first clamp lever to said first key and a second screw connecting said second clamp lever to said second key.

7. The apparatus of claim 6, wherein said first screw includes a first shaft having a first head at a first proximal end and said first key at a first distal end.

8. The apparatus of claim 7, wherein said second screw includes a second shaft having a second head at a second proximal end and said second key at a second distal end.

9. A method of carrying cargo over a cargo bed, comprising:
- raising a first rail from a stowed position into a deployed position;
- releasing a first end of said first rail from a first track member;
- pivoting said first end of said first rail over said cargo bed; and
- engaging said first end of said first rail with a second track member at an opposite side of said cargo bed.

10. The method of claim 9, including unclamping said first end from said first track member.

11. The method of claim 10, including displacing a first key at said first end through a second keyway and a first keyway of said first track member to release said first end from said first track member.

12. The method of claim 11, including inserting said first key through a fourth keyway in said second track member to engage said first end of said first rail with said second track member.

13. The method of claim 12, including sliding said first key along a second channel in said second track member and then clamping said first end to said second track member.

\* \* \* \* \*